United States Patent [19]

Watson et al.

[11] Patent Number: 5,436,287
[45] Date of Patent: Jul. 25, 1995

[54] REPULPABLE LAMINATING ADHESIVE CONTAINING AN ETHYLENE VINYL ACETATE COPOLYMER HAVING 40–60 WEIGHT PERCENT OF VINYL ACETATE UNITS, AN OXYGEN-CONTAINING COMOUND, A TACKIFIER AND A WAX

[75] Inventors: Michael D. Watson, Tulsa; William P. Cottom, Mounds; Susan M. Teeters, Sand Springs, all of Okla.; Charles H. Heroux, Scarborough, Canada; Terrance D. Duryee, Charlotte, N.C.

[73] Assignee: Petrolite Corporation, St. Louis, Mo.

[21] Appl. No.: 17,783

[22] Filed: Feb. 16, 1993

[51] Int. Cl.6 .............. C08L 93/04; C08L 91/06; C08L 31/04; C08L 51/06
[52] U.S. Cl. .................. 524/272; 524/275; 524/277; 524/284; 524/385; 524/478; 524/487; 524/488; 524/504; 524/563
[58] Field of Search .............. 524/270, 271, 272, 273, 524/274, 275, 277, 478, 480, 487, 488, 489, 284, 385, 504, 563

[56] References Cited

U.S. PATENT DOCUMENTS

| | | | |
|---|---|---|---|
| 3,239,476 | 3/1966 | Harlan, Jr. | 428/349 |
| 3,390,035 | 6/1968 | Sands | 156/72 |
| 3,417,040 | 12/1968 | Kremer | 524/235 |
| 3,837,994 | 9/1974 | Flanagan et al. | 428/122 |
| 4,237,037 | 12/1980 | Takahashi | 524/277 |
| 4,299,745 | 11/1981 | Godfrey | 524/488 |
| 4,299,930 | 11/1981 | Boggs | 524/271 |
| 4,405,747 | 9/1983 | Ehmann | 524/503 |
| 4,434,261 | 2/1984 | Brugel et al. | 524/109 |
| 4,871,803 | 10/1989 | Zimmel et al. | 525/89 |
| 4,992,501 | 2/1991 | Hanninen et al. | 524/272 |
| 5,055,526 | 10/1991 | Sato et al. | 525/74 |
| 5,071,914 | 12/1991 | Zimmel et al. | 525/113 |
| 5,143,961 | 9/1992 | Scholl et al. | 524/312 |

FOREIGN PATENT DOCUMENTS 0045567 2/1982 European Pat. Off. .......... 524/272

PCT/US90/-05599 10/1989 WIPO.

OTHER PUBLICATIONS

Bareco Division of Petrolite Corporation, "Microcrystalline Waxes in Protective Packaging", Release No. 305.0, (Feb. 1, 1976).

(List continued on next page.)

Primary Examiner—Peter A. Szekely
Attorney, Agent, or Firm—Pravel, Hewitt, Kimball & Krieger

[57] ABSTRACT

The present invention relates to a repulpable laminating adhesive which contains an elastomer, tackifier and a 5:95 to 100:0 by weight blend comprising a high molecular weight oxygen-containing polymer and a wax.

The oxygen-containing polymer is preferably of the formula $$A-B \qquad (I)$$

wherein A is represented by a unit of the formula

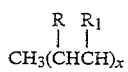 (IA)

and B is represented by a unit of the formula

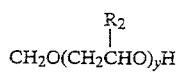 (IB)

and further wherein R and $R_1$ are independently selected from the group consisting of hydrogen and a $C_1$–$C_{10}$ alkyl group; $R_2$ is hydrogen or a $C_1$–$C_5$ alkyl group; x is greater than or equal to 1 but less than 70; and y is between about 0 to about 45; provided the weight percent of $B/A+B$ is between 0 and 50 percent and the molecular weight of the A unit is less than 2,000.

35 Claims, No Drawings

FOREIGN PATENT DOCUMENTS

Doshi et al., "Additive to Combat Sticky Contaminants in Secondary Fibers", 1989 Contaminent Problems and Strategies in Wastepaper Recycling, TAPPI Seminar Notes, pp. 81–89.

Tom Garbutt et al., "A Technical Respective of the Effect of Hot Melt Adhesives on the Recycling of Post Consumer Recovered Paper/Paperboard Materials", pp. 159–164.

Graves et al., "A Study of the Effects of Wax Structure on the Performance Properties of EVA Based Hot Melt Adhesives", reprint of paper presented at 1987 ASC Raw Materials Seminar in Cincinnati, Ohio.

Lennert, "What's Up at P&G in Composting and Recycling", pp. 127–133.

McKinney, "A Review of Stickie Control Methods, Including the Role of Surface Phenomena in Control", 1989 Contaminant Problems and Strategies in Wastepaper Recycling, TAPPI Seminar Notes, pp. 101–107.

Unmuth et al., "Hot Melt Laminants, Background and intercomparison", a paper presented at the Technical Session of the Hot Melt Committee held at the 1972 Paper Synthetics Conference of TAPPI.

"ELVAX® and Wax—Components in Formulated Hot Melt Adhesives", *ELVAX*® Technical Notes, Start with Dupont.

Domine et al., "Ethylene Copolymer Based Hot Melt Adhesives".

REPULPABLE LAMINATING ADHESIVE CONTAINING AN ETHYLENE VINYL ACETATE COPOLYMER HAVING 40–60 WEIGHT PERCENT OF VINYL ACETATE UNITS, AN OXYGEN-CONTAINING COMOUND, A TACKIFIER AND A WAX

BACKGROUND OF THE INVENTION

Wax-based, hot-melt laminates have long been used in the packaging industry. They offer excellent protective barrier properties and thus serve to protect the contents of packages against the loss or gain of moisture vapor or gases.

In addition to performing as a protective barrier film, such laminates also act as adhesives. The adhesive characteristics permit the joining of dissimilar-films, foils or papers. In addition, hot melt laminates are important adhesives for bonding difficult to wet substrates or for bonding substrates which are rigid and load bearing.

The prior art hot melt laminates largely consist of three ingredients—an elastomer (such as a conventional ethylene vinyl acetate copolymer containing about 28 weight percent vinyl acetate units), a tackifier and a wax. The strength of the laminate is measured by its ability to bond two surfaces together. This is controlled not only by the adhesion to the surfaces involved, but also to the cohesive strength of the laminate itself and by the cohesive characteristics of the substrate. The adhesive strength factor depends upon the chemical-mechanical bond that is created between the laminate and the surface of the substrate.

Laminate adhesives are used in several industries, including the food industry. As landfills continue to close and concerns about the environment are increased, interest in development of recyclable laminate adhesives is being renewed.

The recycling of wastepaper from materials containing hot melt laminates proceeds generally by one of three methods. In two of the methods, the adhesive is separated from a water slurry of the recycled fibers using either cleaners or screens. When screens are employed, the pulp slurry is passed through a cylindrical screen plate fitted with small holes or fine vertical slots. The particles of the adhesives are separated out and rejected. When cleaners are used, the pulp slurry is pumped into the cleaner to form a spiraling flow. The slurry is thereby subjected to a centrifugal field. A central core is formed in which the particles of hot melt adhesives concentrate. A portion of the pulp slurry is extracted from this central core carrying the rejected laminate adhesive particles.

In the third method, a thickened pulp slurry is heated to a temperature, generally ranging from 180° F. to 250° F. It is then subjected to an intensive shearing and/or kneading action. The hot melt particles are broken down to fine sizes, thereby minimizing spotting. Considerable energy is expended, however, in the process.

In the design of modern recycling systems, interest has been centered on those properties of laminates which are useful in the separation of the adhesive particulates from the pulp slurry. Much attention has been paid to the size of the adhesive particulate and its resistance to breakup when the wastepaper is wetted and broken up in a pulper. Pulpers have been specifically designed to minimize breakup of the laminate particulate during the pumping action. The larger particulates are separated from the pulp slurry with screens. To separate the particulates that pass through the screens, the pulp slurry is pumped into a through-flow cleaner wherein the smaller laminate adhesive particulates are removed. If screening and cleaning are insufficient to produce the required cleanliness, the pulp is subjected to dispersion.

Laminate adhesives must be repulpable in order to maximize wastepaper quality. Such laminates typically contain an elastomeric resin and a tackifying resin. In addition, they may contain antioxidants, fillers and plasticizers. The elastomeric resin serves to form the backbone and contributes to the cohesive strength and toughness of the composition. Tackifying resins promote specific adhesion and help the adhesive to wet the substrate. In addition, a wax is added to decrease melt viscosity, increase the crystallinity and control the open and set times of the elastomeric resin.

Microcrystalline waxes, as well as paraffin waxes, are principally used in commercially available hot melt laminates. In addition to such waxes, commercially available laminating adhesives further contain a tackifier and a resin. The resin is principally either a conventional ethylene vinyl acetate copolymer (having between 25 and 28 weight percent of vinyl acetate units) or a synthetic rubber.

Previous efforts to recycle materials containing laminate adhesives has in the past been largely unsuccessful due to the non-disperability of waxes contained in such adhesives.

It is most desired to develop a hot melt laminate adhesive which is compatible with aqueous systems and is recyclable. Compatibility defines the ability of the composition to impart adhesive properties to contiguous layers. Compatibility may be measured by various means such as viscosity stability, melt flow characteristics and cloud point. In particular, compatibility references the physical state wherein the elastomeric resin, tackifier and other additives are in a homogenous indistinct blend. In an incompatible adhesive, the elastomer, tackifier and other additives are in discrete areas in the molten state.

SUMMARY OF THE INVENTION

The present invention is drawn to a blend comprising 5:95 to 100:0 percent by weight of an oxygen-containing compound and a wax.

A particularly preferred oxygen-containing compound is an alcohol of the formula:

A–B (I)

wherein A is represented by a unit of the formula

$$\underset{CH_3(CHCH)_x}{\overset{R\ \ R_1}{|\ \ |}} \quad \text{(IA)}$$

and B is represented by a unit of the formula

$$\underset{CH_2O(CH_2CHO)_yH}{\overset{R_2}{|}} \quad \text{(IB)}$$

and further wherein R and $R_1$ are independently selected from the group consisting of hydrogen and a $C_1$–$C_{10}$ alkyl group; $R_2$ is hydrogen or a $C_1$–$C_5$ alkyl group; x is greater than or equal to 1 but less than 70; and y is between about 0 to about 45; provided the weight percent of B/A+B is between 0 and 50 percent and the molecular weight of the A unit is less than 2,000.

The oxygen-containing compound can further be a high molecular weight carboxylic acid or a cyclic anhydride graft copolymer.

The invention further provides hot melt laminates containing such blends along with an ethylene vinyl acetate copolymer. The ethylene vinyl acetate copolymer contains between 40 and 60 weight percent of vinyl acetate units. The addition of the oxygen-containing compound to the elastomeric resin increases the compatibility of the resin and tackifier, thereby rendering a repulpable laminating adhesive.

The weight ratio of oxygen-containing compound to ethylene vinyl acetate copolymer is between about 1:1 and about 2:1.

A portion of the oxygen-containing compound may be substituted with an alkoxylated alcohol of the formula

C–D    (II)

wherein C is represented by a unit of the formula

$$\begin{array}{cc} R & R_1 \\ | & | \\ CH_3(CHCH)_g \end{array} \quad \text{(IIA)}$$

and D is represented by a unit of the formula

$$\begin{array}{c} R_2 \\ | \\ CH_2O(CH_2CHO)_hH \end{array} \quad \text{(IIB)}$$

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 2 to about 817; provided that the weight ratio of D/C+D is between 51 and about 90 percent and the weight ratio of oxygen-containing compound and alkoxylated alcohol is greater than or equal to 1:1.

DESCRIPTION OF THE PREFERRED EMBODIMENTS

The invention relates to a blend used in the production of laminating adhesives and laminating adhesives containing such blends.

The blend contains an oxygen-containing compound and wax particles. When combined with an ethylene vinyl acetate copolymer, having from about 40 to about 60 weight percent, most preferably 45 to 50, of vinyl acetate units, a compatible, dispersible and repulpable hot melt laminating adhesive is rendered. The high vinyl acetate content of the copolymer increases the dispersability and repulpability of the resin as compared to conventional ethylene vinyl acetate copolymers which have a vinyl acetate content of approximately 28 percent. The latter when combined with the oxygen-containing compound of this invention are neither dispersible or repulpable.

The oxygen-containing compound may be an alcohol, a carboxylic acid or a cyclic anhydride graft polyolefin.

The molecular weight of the alkyl portion, comprising only carbon and hydrogen, of the oxygen-containing compound is less than 2,000, preferably less than 1,500, most preferably less than 1,000.

The high molecular weight carboxylic acid is preferably a monocarboxylic acid of the formula RCOOH wherein R is a straight or linear chain saturated hydrocarbon of molecular weight less than 2,000. When the oxygen-containing compound is a monocarboxylic acid, the molecular weight of R is most preferably between 300 and 800.

The oxygen-containing compound can further be a hydrocarbon having multiple functional groups, such as carboxylic acid, carboxylic acid anhydrides, ketones, alcohols, esters, etc., distributed along their chains or are the result of a graft polymerization process. Particularly preferred are linear polyolefins, such as the polyethylenes, upon which has been grafted cyclic anhydrides such as maleic, fumaric and itaconic anhydride. Maleic acid anhydride is particularly preferred. The acid groups are grafted onto a polyolefin backbone which typically is polyethylene, polypropylene, and copolymers of ethylene and propylene. As set forth above, the molecular weight of the backbone is less than 2,000. The functional groups of the graft copolymers may be generally quantified by determination of an acid number which is the amount of potassium hydroxide in milligrams required to neutralize one gram of the polymer. Such graft copolymers further generally have an acid number in the range of about 5 to about 200.

The preferred oxygen-containing compounds for use in this invention are the high molecular weight alcohols of the formula

A–B    (I)

wherein A is represented by a unit of the formula

$$\begin{array}{cc} R & R_1 \\ | & | \\ CH_3(CHCH)_x \end{array} \quad \text{(IA)}$$

and B is represented by a unit of the formula

$$\begin{array}{c} R_2 \\ | \\ CH_2O(CH_2CHO)_yH \end{array} \quad \text{(IB)}$$

and further wherein R and $R_1$ are independently selected from the group consisting of hydrogen and a $C_1$–$C_{10}$ alkyl group; $R_2$ is hydrogen or a $C_1$–$C_5$ alkyl group; x is greater than or equal to 1 but less than 70, preferably from about 9 to about 60, most preferably from about 11 to about 45; and y is between about 0 to about 45, preferably 3 to 40, most preferably 14 to 25; provided the weight percent of B/A+B is between 0 and 50 percent. The weight percent of B/A+B is preferably between 0 and 20 percent. The molecular weight of the A units are less than 2,000, preferably less than 1500, most preferably less than 1,000.

Exemplary of suitable alcohols for use in the several embodiments of this invention (wherein y is zero) are those of the formula

$$\begin{array}{cc} R & R_1 \\ | & | \\ CH_3(CHCH)_xCH_2OH \end{array} \quad \text{(III)}$$

wherein R and $R_1$ individually represent hydrogen or the same or different lower alkyl groups of from 1 to about 10 carbon atoms; and x is greater than or equal to 1 but less than 70, and preferably from about 9 to about 60. Such alcohols are commercially available under the trade name UNILIN ® alcohols from Petrolite Polymers Division of Petrolite Corporation, Tulsa, Okla. Examples of such long chain primary alcohols are UNILIN ®-425, UNILIN ®-550 and UNILIN ® 350 which have a molecular weight of about 425, 550, and 350, respectively.

Alcohols of formula (III) typically average 24 to 45 carbon atoms (on a weight basis), preferably 28 to 42 carbon atoms, most preferably about 30 to 40 carbon atoms. Such alcohols are derived by hydroxylating long chain hydrocarbons.

When y of formula IB is greater than or equal to 1, the A unit of the alcohol may have a molecular weight between about 200 to about 2,000 most preferably between 350 to about 1,000. Especially preferred alcohols (wherein y is greater than or equal to 1) include UNITHOX ® 420 ethoxylate and UNITHOX ® 520 ethoxylate. UNITHOX ® 420 and UNITHOX ® 520 are ethoxylated alcohols which consist of 80 weight percent of units of the formula IA:

and 20 weight percent of ethoxylate units of the formula IB:

wherein R, $R_1$ and $R_2$ are all hydrogen. The average molecular weight of UNITHOX ® 420 and UNITHOX ® 520 are 530 and 690, respectively. Such products are commercially available from Petrolite Polymers Division in Tulsa, Okla.

Especially preferred high molecular weight alcohols for use in formulating the blends for use in laminating adhesives are those represented by formula (I) above wherein R and $R_1$ are independently selected from the group consisting of—H and $C_1$–$C_{10}$ alkyl and $R_2$ is—H or a $C_1$–$C_5$ alkyl group. Most preferred are those compounds represented by the formula:

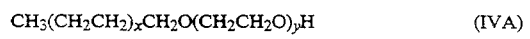 (IVA)

and

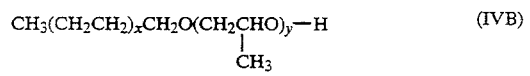 (IVB)

as well as mixtures thereof. As an alternative the compound may be of formula (I) above where $R_2$ is randomly selected from the substituents —H and —$CH_3$.

The wax component can be polyolefin waxes such as polyethylene wax. The polyolefin used in preparation of the compositions of this invention is preferably those having a molecular weight of about 300 to about 5,000. The polyolefin may be linear or may have a number of branch formations in its molecular structure. When branched, the polyethylenes preferably have one or two branches per molecule on the average and the branches may have 1 to 6 carbon atoms, preferably $C_1$–$C_6$ alkyl group.

In addition to such synthetic waxes as polyolefin waxes, the wax of the present invention may comprise petroleum-derived waxes like paraffin and microcrystalline waxes.

The paraffin waxes are mostly linear alkanes having about 20–36 carbon atoms per molecule on the average and a molecular weight of about 280–500 and may include $C_{18}$–$C_{36}$ isoalkanes and cycloalkanes.

Microcrystalline waxes are preferred since generally they do not form brittle bonds. The microcrystalline waxes generally have molecular weights of about 500–700 with somewhat more branching than the paraffin waxes. The microcrystalline waxes may be hard waxes (having a melt point greater than 185° F. and a penetration number, by ASTM 1321, lower than 17) or soft waxes (having a melt point lower then 185° F. and a penetration number greater than 17).

Furthermore, the wax of the present invention may include Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600–1,000.

Other closely related materials that can be used include the natural waxes, such as beeswax, carnauba and candelila waxes. In addition, the composition of this invention may contain a mixture of any of the waxes set forth above.

Also contemplated in the present invention is a wax which has been chemically modified. These include the partially oxidized polyethylenes, polymethylenes and the petroleum-derived waxes.

The blend comprises 5:95 to 100:0, preferably 5:95 to 95:5, percent by weight of oxygen-containing compound to hydrocarbon wax. Particularly preferred are those blends having a weight ratio of 20:80 to 30:70.

The invention is further drawn to a laminating adhesive containing (i) a blend of oxygen-containing polymer and hydrocarbon wax; (ii) elastomer; and (iii) tackifier. The oxygen-containing compound and hydrocarbon wax are selected from those species set forth in the above paragraphs. The oxygen-containing compound and hydrocarbon are present in a weight ratio of 5:95 to 100:0, preferably 5:95 to 95:5, most preferably 20:80 to 30:70.

Approximately 75 to about 95 percent by weight of the laminate adhesive of this invention is the blend of wax and oxygen-containing compound. Preferably, about 80 to 90, most preferably 83 to 85, parts by weight of the laminating adhesive of this invention is the blend.

When at least partially cured, the compositions may be used in laminates as the intermediate layer functioning to hold together the contiguous layers of the laminate. When used in such laminates, the laminates have been shown to be repulpable.

Antioxidants, fillers and plasticizers may further be incorporated in the adhesive system of this invention.

The ethylene vinyl acetate copolymers for use in the laminating adhesives are compatible with the oxygen-containing compounds set forth above. Such polymers render the dispersible resin and tackifier compatible. The use of the oxygen-containing compounds further render an adhesive system which is repulpable while exhibiting good adhesive properties.

Elastomeric resins containing a high percentage of vinyl acetate wherein the amount of vinyl acetate is greater than 40% include the ELVAX ® series of resins, such as ELVAX ® 46 and ELVAX ® 46L, of Du Pont-Mitsui Polychemicals Ltd.

The use of such resins by themselves are unsuitable for use as laminating adhesives since they are incompatible with conventional tackifiers and waxes. Such resins have been found to be compatible however with the oxygen-containing compounds of this invention. The addition of the oxygen-containing compound to the copolymer increases the compatibility of the copolymer and tackifier thereby making the laminating adhesive repulpable. When added to an ethylene vinyl acetate copolymer having high vinyl acetate content and/or a tackifier, the resulting laminating adhesive system is repulpable and exhibits good adhesive properties.

About 2 to about 15, most preferably 10 to about 12 parts by weight of the adhesive composition of this invention is the ethylene vinyl acetate resin.

The tackifying resin serves to extend the adhesive properties of the elastomeric polymer. Such tackifying resins include (1) natural and modified rosins, such as gum rosin, wood rosin, tall oil rosin, distilled rosin, hydrogenated rosin, dimerized rosin and polymerized rosin; (2) glycerol and pentaerythritol esters of natural and modified rosin such as, for example, the glycerol ester of pale, wood rosin, the glycerol ester of hydrogenated rosin, the glycerol ester of polymerized rosin, the pentaerythritol ester of hydrogenated rosin and the phenolic-modified pentaerythritol ester of rosin; (3) polyterpene resins especially those resulting from the polymerization of terpene hydrocarbons, such as the bicyclic mono-terpene known as pinene, in the presence of Friedel-Crafts catalysts; (4) chlorinated terphenyl resins containing from about 42 to 60%, by weight, of chlorine; (5) phenolic-modified terpene resins such as, for example, the resin product resulting from the condensation in an acidic medium of a bicyclic terpene and a phenol; and (6) aliphatic petroleum hydrocarbon resins principally those resulting from the polymerization of monomers consisting primarily of olefins and diolefins. Excellent results have been obtained with polymerized rosin pale, wood rosin, the glycerol ester of hydrogenated rosin, the glycerol ester of polymerized rosin, the pentaerythritol ester of hydrogenated rosin, and phenolic-modified pentaerthyritol ester of rosin which has been hydrogenated. Terpene and coumaroneindene resins are also employed. Polyterpene-resins (obtained by distillation of conifers), phenolic resins, and petroleum hydrocarbon resins, maleic anhydride-modified rosin and rosin derivatives, partial esters of styrene-maleic acid copolymers, chlorinated biphenyls and oil-soluble phenol-aldehyde resins can also be used.

Effective proportion of tackifier for use in the present invention is about 1 to about 10 weight parts of the laminating adhesive composition.

Also contemplated in the present invention is the substitution in the blend of a portion of the oxygen-containing compound with an alkoxylated alcohol. The weight ratio of oxygen-containing compound to alcohol is greater than or equal to 1:1. Most preferably, the weight ratio of oxygen-containing compound to alkoxylated alcohol is greater than 3:1.

Exemplary of such alkoxylated compounds are those represented by the formula:

$$C-D \quad (II)$$

wherein C is represented by a unit of the formula

and D is represented by a unit of the formula

and further wherein R and $R_1$ are independently selected from the group consisting of hydrogen and a $C_1$-$C_{10}$ alkyl group; $R_2$ is hydrogen or a $C_1$-$C_5$ alkyl group; g is between about 1 to about 142, preferably from about 9 to about 113, most preferably 11 to 45; and h is between about 2 to about 817, preferably 3 to about 65, most preferably 4 to 50; provided that the weight percent of D/C+D is between 51 and about 90, preferably 75 to 85, most preferably 80. The average molecular weight of the C unit or unit of formula IIA may range from about 200 to about 4,000, preferably no greater than 1,000. (When the average molecular weight is 1,000, g is 34.)

Especially preferred alkoxylated alcohols include UNITHOX ® 480 and UNITHOX ® 580. UNITHOX ® 480 and UNITHOX ® 580 are ethoxylated alcohols which consist of 20 weight percent of units of the formula IIA:

and 80 wt. % of ethoxylate units of the formula IIB:

wherein R, $R_1$ and $R_2$ are all hydrogen. The molecular weight of the units of formula IIA of UNITHOX ® 480 and UNITHOX ® 580 is about 425 and 550, respectively. Such products are commercially available from Petrolite Polymers Division in Tulsa, Okla.

It is preferred that g for formula IIA and x for formula IA be approximately equal. Best results have been obtained when the chain length of the alcohol moiety of formula IA and formula IIA are approximately the same.

A stabilizer can further be added to the laminating adhesive system of the invention. Such stabilizers serve to enhance the pot-life of the molten adhesive. Typically useful stabilizers or antioxidants for the adhesive composition are the 2,4,6-trialkylated monohydroxy phenols, e.g., 2,4,6-tri-tertiarybutyl phenol and 2,6-di-tertiary-butyl-4-methyl phenol, 4,4'-thio-bis (6-tertiary butyl m-cresol); butylated hydroxy anisole and butylated hydroxy toluene. Effective proportions of stabilizer ordinarily are in the range of from about 25 parts per million to about 0.5 part per 100 parts by weight of the adhesive composition, preferably about 0.1 to 0.4 part per 100.

The blends of this invention usually have a softening point within the range of 60°–120° C. and are added to a blend of elastomeric and tackifier (and wax and stabilizer when present) at a temperature between 140° C. and 220°.

The alcohols of formula I (wherein y is not zero) and the alkoxylated alcohols of formula II are prepared by reacting the corresponding alcohol with an oxyalkylating agent. The alcohol may be reacted with such oxyalkylating agents such as ethylene oxide, propylene oxide and mixtures thereof. The reaction proceeds in the presence of a conventional base catalyst, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation. By varying the molecular weight of the starting alcohol and the amount of alkoxylation, a variety of compounds of varying molecular weights can be prepared.

The compositions of this invention are extremely useful as repulpable adhesives for those cellulose containing products consisting of light to heavy paper products including tissue, newsprint, Kraft paper, cardboard stock and the like. The paper can be light weight, such as facial tissue, to heavy fiber stock such as corrugated cardboard manufacture. The paper face stock may be formed of any pulpable cellulosic fiber material, virgin and recycled.

The laminating adhesives of this invention may be produced by a variety of methods. For instance, the elastomer and tackifier could be first melted. To the molten mass, the oxygen-containing compound is added. If an alkoxylated alcohol is used as a partial substitute for the oxygen-containing compound, the alkoxylated alcohol is also added at this juncture.

To practice this invention, it is recognized that any of the components comprising the laminating adhesive could be packaged separately to be added to the remaining components. For instance, the ethylene vinyl acetate copolymer could be packaged separately to be added to the tackifier and blend by an end user. Likewise, the end user could add prepackaged blends of oxygen-containing compound and wax to the ethylene vinyl acetate copolymer and tackifier.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLE I

A heavy duty mixer equipped with a stirring paddle was used with a suitable container which had been heated to 320° F. and charged with 63 parts of a microcrystalline wax blend set forth in Table I.

TABLE I

| Amount Microcrystalline Wax | ASTM D 127 melt pt. °F. | ASTM D1321 Penetration at 77° F., mm |
|---|---|---|
| 40 parts | 169–171 | 28–30 |
| 16 parts | 176–178 | 16–18 |
| 7 parts | 196–198 | 5½–6 |

The wax was completely melted. Stirring was then initiated whereupon 12 parts of an ethylene-vinyl acetate copolymer, commercially available as ELVAX ® 46, was added slowly in order to prevent the formation of lumps. Heating and stirring were continued until a homogeneous mass was obtained whereupon five parts of polyterpene resin (commercially available under the trade name of WINGTACK) was added slowly in order to prevent the formation of lumps. Heating and stirring were continued until a homogeneous mass was obtained whereupon 20 parts of UNITHOX ® 420 was added to reduce the melt viscosity of the system.

A molten sample of laminating adhesive as prepared above was applied between two sheets of paper. After cooling, two grams of paper with adhesive were cut into approximately one-half to one inch squares. (In a ½ inch square there was approximately 0.1 g of adhesive.) Two hundred grams of alkaline water (pH of 10) was added to a waring blender at a 120° F. Two grams of the cut paper with adhesive were then added to the blender and mixed for 15 minutes at a medium speed. The liquid was then poured through a 60 mesh screen. The filtrate was then vacuumed dried, pressed and then air dried.

EXAMPLE II

This example illustrates the preparation of the blend of microcrystalline wax and alkoxylated alcohol. A heavy duty mixer equipped with a stirring paddle was used with a suitable container which having heated to 320° F. and charged with 63 parts of BE SQUARE ® 195 microcrystalline wax. Heating and stirring were continued until a homogenous mass was obtained whereupon 20 parts of UNITHOX ® 420 was added to reduce the melt viscosity of the system. The wax and UNITHOX were stirred and heated for approximately 1 hour at 300° F. The blend was then cooled.

What is claimed is:

1. A laminating adhesive comprising
   (A) an ethylene vinyl acetate copolymer containing between about to about 60 weight percent based on the weight of copolymer of vinyl acetate units;
   (B) a tackifier; and
   (C) a 5:95 to 95:5 weight percent blend of
      (i) an oxygen-containing compound, the alkyl portion of which has a molecular weight less than 2,000, selected from the group consisting of
         (a) an alcohol of the formula:

$$A-B \qquad (I)$$

wherein A is represented by a unit of the formula

$$(IA)$$

and B is represented by a unit of the formula

$$(IB)$$

where R and $R_1$ are independently selected from the group consisting of hydrogen and a $C_1-C_{10}$ alkyl group; $R_2$ is hydrogen or a $C_1-C_5$ alkyl group; x is between from about 9 to about 70; and y is 0 to about 45; provided the weight ratio of $B/A+B$ is between 0 and 50 percent and the molecular weight of the A units when y is zero is less than 2,000;

(b) a saturated monocarboxylic acid having a molecular weight between 300 and 2,000; and (c) a graft copolymer wherein the grafting monomer is a cyclic anhydride and the backbone is a polyolefin; and (ii) a linear or branched chain hydrocarbon wax wherein said laminating adhesive is repulpable.

2. The laminating adhesive of claim 1 wherein the weight ratio of oxygen-containing compound to ethylene vinyl acetate copolymer is between about 1:1 and about 2:1.

3. The laminating adhesive of claim 1 wherein the molecular weight of the alkyl portion of the oxygen-containing compound is less than 1,000.

4. The laminating adhesive of claim 1 wherein the hydrocarbon is selected from the group consisting of synthetic polyethylene wax, paraffin wax, microcrystalline wax, Fischer-Tropsch wax, partially oxidized polyethylene, partially oxidized polymethylene, partially oxidized paraffin wax and partially oxidized microcrystalline wax.

5. The laminating adhesive of claim 1 wherein the oxygen-containing compound is an alcohol of formula (I) and further wherein y is zero.

6. The laminating adhesive of claim 1 wherein the molecular weight of the A unit is less than 1,500.

7. The laminating adhesive of claim 1 wherein the weight percent of vinyl acetate in the copolymer is between 45 and 50.

8. The laminating adhesive of claim 1 wherein a portion of the oxygen-containing compound is substituted with an alkoxylated alcohol of the formula:

C–D  (II)

wherein C is represented by a unit of the formula

  (IIA)

and D is represented by a unit of the formula

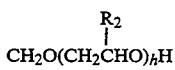  (IIB)

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 2 to about 817; provided that the weight ratio of D/C+D is between 51 and about 90 and the weight ratio of oxygen-containing compound to alkoxylated alcohol is greater than or equal to 1:1.

9. The laminating adhesive of claim 8 wherein g of the formula (IIA) and x of the formula (IA) are approximately equivalent.

10. A laminating adhesive comprising
(a) about 75 to about 95 percent by weight of a 5:95 to 95:5 weight percent blend of
(i) an oxygen-containing compound, the alkyl portion of which has a molecular weight less than 2,000, selected from the group consisting of
(a) an alcohol of the formula:

A–B  (I)

wherein A is represented by a unit of the formula

  (IA)

and B is represented by a unit of the formula

  (IB)

where R and $R_1$ are independently selected from the group consisting of hydrogen and a $C_1$–$C_{10}$ alkyl group; $R_2$ is hydrogen or a $C_1$–$C_5$ alkyl group; x is between from about 9 to about 70; and y is 0 to about 45; provided the weight ratio of B/A+B is between 0 and 50 percent and the molecular weight of the A units when y is zero is less than 2,000;

(b) a saturated monocarboxylic acid having a molecular weight between 300 and 2,000;

(c) a graft copolymer wherein the grafting monomer is a cyclic anhydride and the backbone is a polyolefin; and (ii) a linear or branched chain hydrocarbon wax;

(b) about 2 to about 15 percent by weight of an ethylene vinyl acetate copolymer containing between about 40 to about 60 weight percent of vinyl acetate units; and (c) about 1 to about 10 percent by weight of a tackifying resin wherein said laminating adhesive is repulpable.

11. The laminating adhesive of claim 10 wherein the molecular weight of the alkyl portion of the oxygen-containing compound is less than 1,000.

12. The laminating adhesive of claim 10 wherein the oxygen-containing compound is an alcohol of formula (I) and further wherein x is between about 9 to about 60.

13. The laminating adhesive of claim 12 wherein x is between about 11 to about 45.

14. The laminating adhesive of claim 12 wherein y is between about 14 to about 25.

15. The laminating adhesive of claim 12 wherein y is 0.

16. The laminating adhesive of claim 10 wherein the blend of component (a) comprises between about 20:80 to 30:70 weight percent of the oxygen-containing compound:hydrocarbon wax.

17. The laminating adhesive of claim 10 wherein the wax is selected from the group consisting of synthetic polyolefin wax, paraffin wax, microcrystalline wax, Fischer-Tropsch wax, partially oxidized polyethylene, partially oxidized polymethylene, partially oxidized paraffin wax and partially oxidized microcrystalline wax.

18. The laminating adhesive of claim 10 wherein the weight ratio of oxygen-containing compound to ethylene vinyl acetate copolymer is between about 1:1 and about 2:1.

19. The laminating adhesive of claim 10 wherein the oxygen-containing compound is of formula I and further wherein y is zero.

20. The laminating adhesive of claim 10 wherein a portion of the oxygen-containing compound is substituted with an alkoxylated alcohol of the formula:

C–D  (II)

wherein C is represented by a unit of the formula $$CH_3(\overset{R}{\overset{|}{C}}H\overset{R_1}{\overset{|}{C}}H)_g \quad \text{(IIA)}$$

and D is represented by a unit of the formula $$CH_2O(CH_2\overset{R_2}{\overset{|}{C}}HO)_hH \quad \text{(IIB)}$$

wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 3 to about 817; provided that the weight ratio of D/C+D is between 51 and about 90 and the weight ratio of oxygen-containing compound and alkoxylated alcohol is greater than 1:1.

21. The laminating adhesive of claim 20 wherein both x of formula (IA) and g of formula (IIA) are approximately identical.

22. The laminating adhesive of claim 20 wherein the weight ratio of D/C+D is between about 75 to about 85 percent.

23. The laminating adhesive of claim 20 wherein g is between about 9 to about 113.

24. The laminating adhesive of claim 23 wherein g is between about 11 to about 45.

25. The laminating adhesive of claim 23 wherein h is between about 3 to about 65.

26. The laminating adhesive of claim 25 wherein h is between about 4 to about 50.

27. The laminating adhesive of claim 10 wherein the weight ratio of B/A+B is between about 0 to about 20 percent.

28. The laminating adhesive of claim 10 wherein the amount by weight of ethylene vinyl acetate and oxygen-containing compound are approximately equal.

29. In a laminating adhesive composition comprising an ethylene vinyl acetate copolymer containing between about 40 to about 60 weight percent of vinyl acetate units, a tackifier, and a wax, the improvement comprising the addition of:

an oxygen-containing compound, the alkyl portion of which has a molecular weight less than 2,000, selected from the group consisting of
(a) an alcohol of the formula:

$$A–B \quad \text{(I)}$$

wherein A is represented by a unit of the formula $$CH_3(\overset{R}{\overset{|}{C}}H\overset{R_1}{\overset{|}{C}}H)_x \quad \text{(IA)}$$

and B is represented by a unit of the formula $$CH_2O(CH_2\overset{R_2}{\overset{|}{C}}HO)_yH \quad \text{(IB)}$$

where R and $R_1$ are independently selected from the group consisting of hydrogen and a $C_1$–$C_{10}$ alkyl group; $R_2$ is hydrogen or a $C_1$–$C_5$ alkyl group; x is between from about 9 to about 70; and y is 0 to about 45; provided the weight ratio of B/A+B is between 0 and 50 percent and the molecular weight of the A units when y is zero is less than 2,000;

(b) a saturated monocarboxylic acid having a molecular weight between 300 and 2,000; and (c) a graft copolymer wherein the grafting monomer is a cyclic anhydride and the backbone is a polyolefin, wherein the weight percent of oxygen-containing compound to wax is between about 5:95 to about 95:5 and further wherein the laminating adhesive is repulpable.

30. The laminating adhesive of claim 29 wherein the improvement further comprises an alkoxylated alcohol of the formula:

$$C–D \quad \text{(II)}$$

wherein C is represented by a unit of the formula $$CH_3(\overset{R}{\overset{|}{C}}H\overset{R_1}{\overset{|}{C}}H)_g \quad \text{(IIA)}$$

and D is represented by a unit of the formula $$CH_2O(CH_2\overset{R_2}{\overset{|}{C}}HO)_hH \quad \text{(IIB)}$$

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 3 to about 817; provided that the weight ratio of D/C+D is between 51 and about 90 and the weight ratio of oxygen-containing compound and alkoxylated alcohol is greater than 1:1.

31. A composition comprising
(a) an ethylene vinyl acetate copolymer containing between about 40 to about 60 weight percent of vinyl acetate units; and
(b) a 5:95 to 95:5 blend of
 (i) an oxygen-containing compound, the alkyl portion of which has a molecular weight less than 2,000, selected from the group consisting of
 (a) an alcohol of the formula:

$$A–B \quad \text{(I)}$$

wherein A is represented by a unit of the formula $$CH_3(\overset{R}{\overset{|}{C}}H\overset{R_1}{\overset{|}{C}}H)_x \quad \text{(IA)}$$

and B is represented by a unit of the formula $$CH_2O(CH_2\overset{R_2}{\overset{|}{C}}HO)_yH \quad \text{(IB)}$$

where R and $R_1$ are independently selected from the group consisting of hydrogen and a $C_1$–$C_{10}$ alkyl group; $R_2$ is hydrogen or a $C_1$–$C_5$ alkyl group; x is between from about 9 to 70; and y is 0 to about 45; provided the weight ratio of B/A+B is between 0 and 50 percent and the molecular weight of the A units when y is zero is less than 2,000; and (b) a graft copolymer wherein the grafting monomer is a cyclic anhydride and the backbone is a polyolefin; and (ii) an aliphatic hydrocarbon wax which when added to a tackifier renders a repulpable laminating adhesive.

32. A mixture comprising
(a) a tackifier; and
(b) a 5:95 to 95:5 blend of
  (i) an oxygen-containing compound, the alkyl portion of which has a molecular weight less than 2,000, selected from the group consisting of
    (a) an alcohol of the formula:

$$A-B \qquad (I)$$

wherein A is represented by a unit of the formula

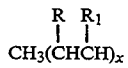

$$\text{(IA)}$$

and B is represented by a unit of the formula

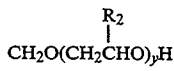

$$\text{(IB)}$$

where R and $R_1$ are independently selected from the group consisting of hydrogen and a $C_1$–$C_{10}$ alkyl group; $R_2$ is hydrogen or a $C_1$–$C_5$ alkyl group; x is between from about 9 to about 70; and y is 0 to about 45; provided the weight ratio of B/A+B is between 0 and 50 percent and the molecular weight of the A units when y is zero is less than 2,000;

(b) a saturated monocarboxylic acid having a molecular weight between 300 and 2,000; and
  (c) a graft copolymer wherein the grafting monomer is a cyclic anhydride and the backbone is a polyolefin; and
(ii) an aliphatic hydrocarbon wax which, when added to an ethylene vinyl acetate copolymer which contains between about 40 to about 60 weight percent of vinyl acetate units, renders a repulpable laminating adhesive of high viscosity and tackiness.

33. A composition consisting essentially of:
(a) an ethylene vinyl acetate copolymer containing between about 40 to about 60 weight percent of vinyl acetate units; and
(b) a 5:95 to 95:5 blend of a saturated monocarboxylic acid of the formula RCOOH wherein the molecular weight of R is between 300 and 2,000; and an aliphatic hydrocarbon wax which when added to a tackifier renders a repulpable laminating adhesive.

34. A laminating adhesive comprising
(A) an ethylene vinyl acetate copolymer containing between about 40 to about 60 weight percent based on the weight of copolymer of vinyl acetate units; and (B) a 5:95 to 95:5 weight percent blend of
  (i) an oxygen-containing compound, the alkyl portion of which has a molecular weight less than 2,000, selected from the group consisting of
    (a) an alcohol of the formula:

$$A-B \qquad (I)$$

wherein A is represented by a unit of the formula

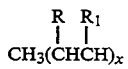

$$\text{(IA)}$$

and B is represented by a unit of the formula

$$\text{(IB)}$$

where R and $R_1$ are independently selected from the group consisting of hydrogen and a $C_1$–$C_{10}$ alkyl group; $R_2$ is hydrogen or a $C_1$–$C_5$ alkyl group; x is between from about 9 to 70; and y is 0 to about 45; provided the weight ratio of B/A+B is between 0 and 50 percent and the molecular weight of the A units when y is zero is less than 2,000;

(b) a saturated monocarboxylic acid having a molecular weight between 300 and 2,000; and
  (c) a graft copolymer wherein the grafting monomer is a cyclic anhydride and the backbone is a polyolefin; and
(ii) a linear or branched chain hydrocarbon wax wherein said laminating adhesive is repulpable.

35. The laminating adhesive of claim 34 wherein a portion of the oxygen-containing compound is substituted with an alkoxylated alcohol of the formula:

$$C-D \qquad (II)$$

wherein C is represented by a unit of the formula

$$\text{(IIA)}$$

and D is represented by a unit of the formula

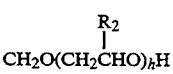

$$\text{(IIB)}$$

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 2 to about 817; provided that the weight ratio of D/C+D is between 51 and about 90 and the weight ratio of oxygen-containing compound to alkoxylated alcohol is greater than or equal to 1:1.

* * * * *

UNITED STATES PATENT AND TRADEMARK OFFICE
CERTIFICATE OF CORRECTION

PATENT NO. : 5,436,287
DATED : July 25, 1995
INVENTOR(S) : Michael D. Watson et al.

It is certified that error appears in the above-identified patent and that said Letters Patent is hereby corrected as shown below:

On the title page item [54], line 6,
"COMOUND" should be "COMPOUND";

Column 10, line 38, after "between about" insert --40--;

Column 12, lines 29-31, should be:

--(c) about 1 to about 10 percent by weight of a tackifying resin wherein said laminating adhesive is repulpable.--

Column 14, lines 5-10 should be:

--(c) a graft copolymer wherein the grafting monomer is a cyclic anhydride and the backbone is a polyolefin, wherein the weight percent of oxygen-containing compound to wax is between about 5:95 to about 95:5 and further wherein the laminating adhesive is repulpable.--

UNITED STATES PATENT AND TRADEMARK OFFICE
CERTIFICATE OF CORRECTION

PATENT NO. : 5,436,287
DATED : July 25, 1995
INVENTOR(S) : Michael D. Watson et al.

It is certified that error appears in the above-identified patent and that said Letters Patent is hereby corrected as shown below:

Column 15, lines 4-6 should be:

--(ii) an aliphatic hydrocarbon wax which when added to a tackifier renders a repulpable laminating adhesive.--

Column 15, lines 51-56 should be:

--(b) a 5:95 to 95:5 blend of a saturated monocarboxylic acid of the formula RCOOH wherein the molecular weight of R is between 300 and 2,000; and an aliphatic hydrocarbon wax which when added to a tackifier renders a repulpable laminating adhesive.--

Signed and Sealed this

Third Day of October, 1995

BRUCE LEHMAN

*Attest:*

*Attesting Officer*           Commissioner of Patents and Trademarks